No. 798,837. PATENTED SEPT. 5, 1905.
F. H. STANLEY.
MANUFACTURE OF RENOVATED BUTTER.
APPLICATION FILED JAN. 6, 1905.
2 SHEETS—SHEET 1.
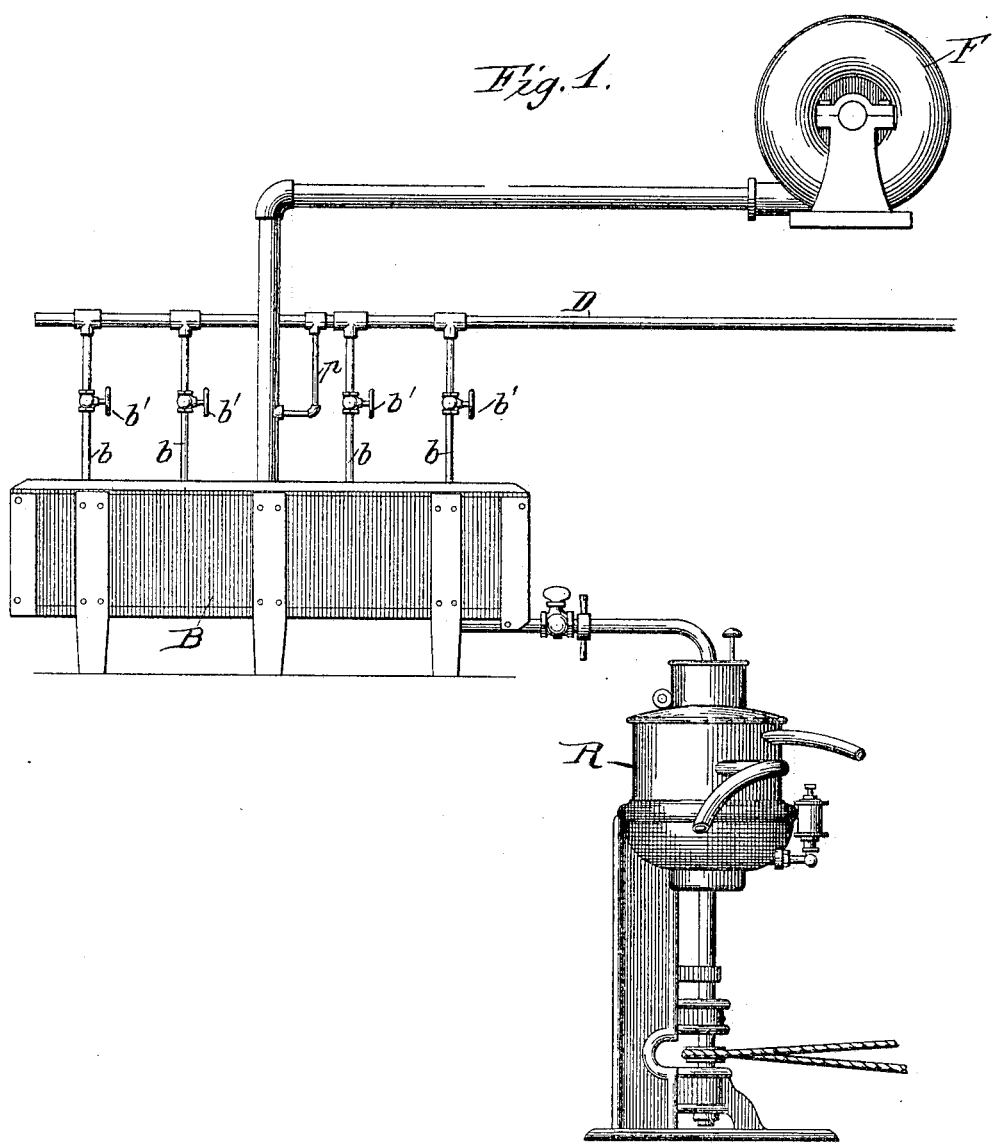
Witnesses.
A. de Brewster
J. J. Jones
Inventor:
Franklin H. Stanley.

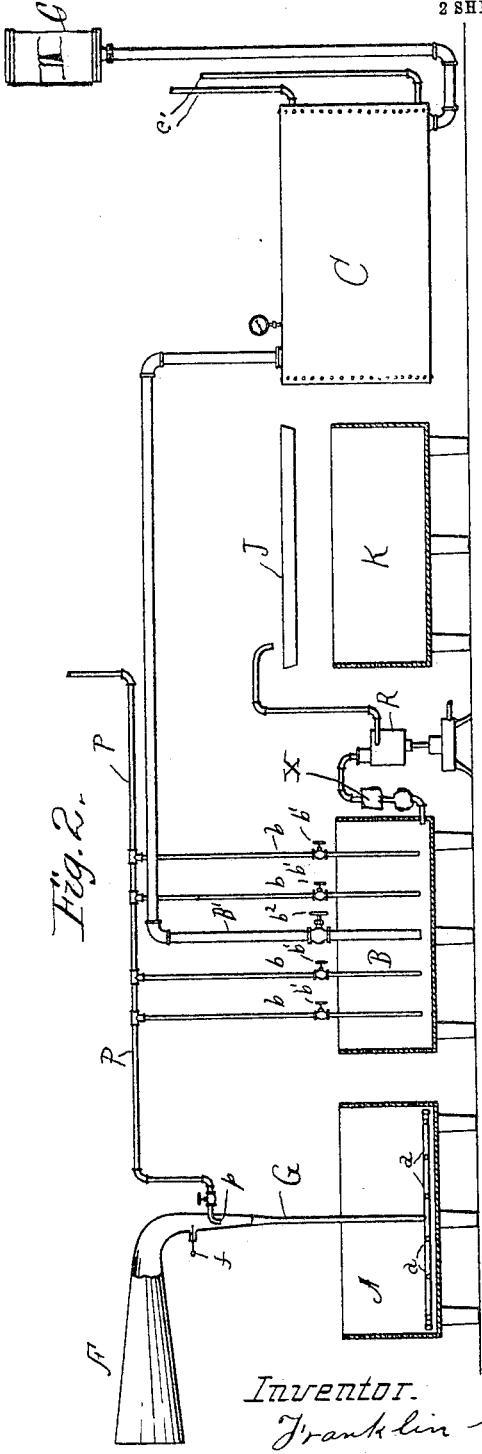

UNITED STATES PATENT OFFICE.

FRANKLIN H. STANLEY, OF CLEVELAND, OHIO.

MANUFACTURE OF RENOVATED BUTTER.

No. 798,837.  Specification of Letters Patent.  Patented Sept. 5, 1905.

Application filed January 6, 1905. Serial No. 239,947.

*To all whom it may concern:*

Be it known that I, FRANKLIN H. STANLEY, a citizen of the United States, residing at Cleveland, in the county of Cuyahoga and State of Ohio, have invented new and useful Improvements in the Process of Manufacturing Renovated Butter, of which the following is a specification.

My invention relates to the renovation of butter by the employment of means and forces in connection with devices adapted both in structure and assemblage to bring into action under certain conditions hereinafter explained said forces and also relates to the process as carried out step by step and under certain conditions.

My invention consists of a process for the converting of dairy butter back to natural cream by mixing forty per cent. butter-oil and sixty per cent. skimmed milk by the employment of hot-vapor pressure or steam-pressure or steam and air combined and in connection with centrifugal force.

My invention further consists in a process which will be hereinafter fully set forth and claimed.

In the drawings I have illustrated devices and assemblages of parts adapted to carry out my process and have illustrated them in certain forms and assemblages which while adapted for the purpose set forth and for the functions described are not necessarily a part of my invention in their assemblage or constructive features, inasmuch as they may and in certain instances will be modified to carry out the process hereinafter set forth, and for this purpose I have illustrated in Figure I what I call a "converting-vat," the operation of which will be hereinafter fully set forth. This figure also shows connection with the blower F, which may be any means of supply of vapor, such as steam, at the proper temperature. I have also in this figure illustrated a centrifugal mixer or centrifugal machine R. Fig. II illustrates a diagrammatical arrangement of mechanical means adapted for the carrying out of my invention.

In carrying out my invention I employ a vat A. (Illustrated in Fig. II.) This vat A is a neutralizing-vat into which the vapor-pipe or a series of them, such as *a a*, communicate (through minute orifices provided in said pipe) and are being fed from a supply-pipe G. This supply-pipe G may be supplied with a mixture of low-temperature vapors or with high-temperature vapors, such as steam, or, in other words, with vapors of low and high temperature, the object being to introduce the vapor for the purpose of mixing or agitating the materials placed therein and which will be hereinafter set forth and to maintain a temperature at a predetermined point, and thus by the introduction of the vapor, which is preferably steam of a temperature approximately 230°, to destroy any germs that may be present in the butter-oil and casein, and thus leave or produce what is known as a "pure butter-oil." The manner in which I attain the temperature of 230° Fahrenheit is by employing a pipe, such as P, which leaves from any suitable steam-generator kept at high pressure, and inasmuch as the steam passing through the pipe P, hence through the pipe G and into the pipes at the lower portion of the vat A, might be higher in temperature than is necessary or which might be at a temperature which would scorch the oils or casein or material, I have provided a cooling medium for the steam at its point of exit *p* into the feeder-pipe G. This cooling device preferably comprises a funnel-shaped inlet F, contracting toward its connection or communication with the steam-inlet *p*, and it is provided at some portion between its inlet and the inlet for the steam with a suitable cut-off or valve *f*. In order to regulate the amount of cooling medium into communication with the steam, thus lowering the temperature where it is too high, or in case the temperature is approximately right, the valve or cut-off *f* may be entirely closed. It will be seen that by the use of this neutralizing device in connection with the heated vapors the material in the vat A is kept in a melted condition and at a predetermined uniform temperature best adapted to obtain a pure butter-oil. Instead of the cooling device above set forth I may employ a fan for this purpose.

In connection with the neutralizing-vat, heretofore described, I employ a suitable converting-vat, which for the sake of illustration and description I have illustrated, one kind in Fig. I and a modification in Fig. II, which will subserve the purpose; but other means than this construction and assemblages may be employed. This converting-vat B is provided with depending pipes, such as *b b b b*, issuing from and communicating with the steam-pipe P, and extends from said pipe to a point close to the bottom of said vat B. The pipes have cut-offs or valves, which are individually supplied, such as b' b' b' b'. Also in connection with this converting tank or vat B, I employ a vapor-pipe B', which is provided with a valve and extends close to the bottom of the vat. The vapor or fluid in the pipe B is under high compression, and for this purpose I provide a tank C, through which by suitable means the vapor or fluid passes in such a manner as to be heated to a temperature approximately 230° Fahrenheit or higher, if necessary. This may be accomplished by any suitable means, such as the air-pump C' and the steam-pipe c', or in any other suitable manner.

After the oil has been neutralized and clarified in the tank A it is passed into the tank B by any suitable means, preferably by means of a pump X and communicating device, (not shown,) where it is acted upon in connection with milk in the proportions of approximately forty per cent. of the oil and sixty per cent. of milk. These proportions, however, may be varied under certain conditions, as is well known to those skilled in this art. After the milk and oil have been introduced into the tank or vat B a high-pressure steam or vapor is turned into the mixture, which causes it to attain a temperature of approximately 154° or 158° Fahrenheit and converts it into the consistency and properties of milk-cream. In this condition, after having been acted upon in the vat B while a cream is formed, it is not in the proper condition to withstand the separating qualities, but would in time separate the oil from the casein, which is intended should be thoroughly incorporated into the homogeneous condition. In order to provide for the proper incorporation and admixture which will withstand the chemical action of separation, the material is passed from the vat B into any centrifugal machine, such as R, which acts upon the material in such a manner as to expand the globules of the oil and allow of the thorough incorporation of the casein with the oil, thus preventing any separation of the casein or oil, but retaining them thoroughly incorporated and homogeneous during the ripening period of the cream. In other words, the cream after passing through the centrifugal machine is almost if not entirely in the same condition as the ordinary milk-cream and passes from the centrifugal machine in any suitable manner over or through a cooling device J, so as to lower its temperature, and from thence passing into the cream-ripening vat K, where it is left to ripen, which vat or surroundings may be retained at a proper ripening temperature—say about 58° Fahrenheit. From this vat K the ripening cream is taken and churned for forming a pure, clean, and pasteurized butter not apt nor liable to become foul, inasmuch as the butyric, caproic, and capric acids have been mostly, if not entirely, eliminated during the process carried out as hereinbefore mentioned.

In setting forth this invention I have employed the words "vapor" and "fluid" in their broadest definition, including air, steam, or analogous gases, and I desire to have it understood, as hereinbefore stated, that a mechanical means, excepting as means properly constructed to subserve their purpose, are no part of my invention, excepting inasmuch as their functional properties are concerned in their action upon the material.

What I claim is—

1. A process for manufacturing or renovating butter, consisting in treating butter-oil and milk to heated fluids, under pressure.

2. A process of manufacturing or renovating butter which consists in subjecting a mixture of oil and milk to the application of heated fluid, under pressure, and subsequently thoroughly agitating and mixing said oil and milk.

3. As a step in the process of manufacturing or renovating butter, the converting of butter-oil and milk into a cream by means of passing through the mixture heated fluids or vapors thence thoroughly agitating or mixing the resultant mixture and thus forming a cream which may be formed into butter by any churning process.

4. As a step in the process of manufacturing or renovating butter, the converting of butter-oil and milk into a cream by means of passing through the mixture heated fluids, under high pressure, thence thoroughly agitating or mixing this resultant mixture and allowing the cream to ripen into condition to be subsequently churned.

5. A process of manufacturing or renovating butter consisting in mixing neutralized butter-oil with milk, treating said mixture with heated fluids or vapors under pressure subsequently further mixing and incorporating the parts, such as butter-oil and casein, to form the cream by subjecting the mixture, previously obtained, to the action of centrifugal force.

FRANKLIN H. STANLEY.

Witnesses:
    F. S. ALDRICH,
    T. B. WILCOX.